(12) United States Patent
Roth et al.

(10) Patent No.: US 8,866,699 B2
(45) Date of Patent: Oct. 21, 2014

(54) SYSTEMS AND METHODS FOR INTERACTING WITH MOBILE DEVICES USING EXTERNAL DISPLAYS

(75) Inventors: Volker Roth, San Francisco, CA (US); Laurent Denoue, Palo Alto, CA (US); Qiong Liu, Milpitas, CA (US); Scott Carter, Los Altos, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1278 days.

(21) Appl. No.: 12/326,767

(22) Filed: Dec. 2, 2008

(65) Prior Publication Data

US 2010/0134385 A1 Jun. 3, 2010

(51) Int. Cl.
*G09G 5/00* (2006.01)
*G06F 3/14* (2006.01)

(52) U.S. Cl.
CPC .......... *G06F 3/1454* (2013.01); *G09G 2370/16* (2013.01); *G09G 2340/145* (2013.01); *G09G 2340/0464* (2013.01); *G09G 2340/0407* (2013.01); *G09G 2340/12* (2013.01)
USPC .......................................... 345/1.2; 345/156

(58) Field of Classification Search
USPC ............................. 345/156–184, 1.1–1.6, 104
See application file for complete search history.

(56) References Cited

U.S. PATENT DOCUMENTS

| | | | |
|---|---|---|---|
| 7,509,588 B2 * | 3/2009 | Van Os et al. | 715/835 |
| 8,286,068 B2 * | 10/2012 | Brush et al. | 715/201 |
| 2004/0065739 A1 * | 4/2004 | Xu et al. | 235/462.1 |
| 2004/0150627 A1 * | 8/2004 | Luman et al. | 345/173 |
| 2005/0125745 A1 * | 6/2005 | Engestrom et al. | 715/847 |
| 2006/0294247 A1 * | 12/2006 | Hinckley et al. | 709/228 |
| 2007/0194123 A1 * | 8/2007 | Frantz et al. | 235/462.45 |
| 2007/0200922 A1 | 8/2007 | Ueno et al. | |
| 2007/0257927 A1 * | 11/2007 | Sakanishi et al. | 345/581 |
| 2008/0200205 A1 | 8/2008 | Liu et al. | |
| 2008/0214233 A1 * | 9/2008 | Wilson et al. | 455/556.1 |
| 2008/0229194 A1 * | 9/2008 | Boler et al. | 715/700 |
| 2010/0079369 A1 * | 4/2010 | Hartmann et al. | 345/156 |

OTHER PUBLICATIONS

R. Ballagas, et al., "Sweep and point and shoot: phonecam-based interactions for large public displays", CHI '05: CHI '05 Extended Abstracts on Human Factors in Computing Systems, pp. 1200-1203, New York, NY, USA, 2005.

S. Greenberg, et al., PDAs and shared public displays: Making personal information public, and public information personal:, Personal Technologies, 3(1):53-64, 1999.

(Continued)

*Primary Examiner* — Patrick F Marinelli
(74) *Attorney, Agent, or Firm* — Sughrue Mion, PLLC (57) ABSTRACT

A system and method for interacting with a mobile device using an external display is disclosed, where a mobile device provides representations of an object and action to an external display for a user to select and then input back to the mobile device. An application on a mobile device provides representation data of an object and an action to a host system driving an external display. The host system arranges the representation data into a representation on the external display and allows the user to interact with the representations. The user then selects a representation and inputs the selected representation into the mobile device, where the application processes the representation to carry out the appropriate actions on the appropriate objects. The representation may be inputted to the mobile device using a photo of the representation taken by a mobile device camera, or by inputting a code provided with each representation on the external display.

17 Claims, 3 Drawing Sheets

(56) References Cited

OTHER PUBLICATIONS

S. Izadi, et al., "The iterative design and study of a large display for shared and sociable spaces", DUX '05: Proceedings of the 2005 Conference on Designing for User Experience, p. 59, New York, NY, USA, 2005.

S. Jeon, et al., "Interaction techniques in large display environments using hand-held devices", VRST '06: Proceedings of the ACM Symposium on Virtual Reality Software and Technology, pp. 100-103, New York, NW, USA, 2006.

H. Jiang, et al., "Direct pointer: direct manipulation for large-display interaction using handheld cameras", CHI '06: Proceedings of the SIGCHI Conference on Human Factors in Computing Systems, pp. 1107-1110, New York, NY, USA, 2006.

A. Madhavapeddy, et al., "Using camera-phones to enhance human-computer interaction", Sixth International Conference on Ubiquitous Computing (Adjunct Proceedings: Demos), 2004.

B. Myers, et al., "Collaboration using multiple PDAs connected to a PC", CSCW '98: Proceedings of the 1998 ACM Conference on Computer Supported Cooperative Work, pp. 285-294, New York, NY, USA, 1998.

P. Peltonen, et al., "It's mine, don't touch!: Interactions at a large multi-touch display in a city centre", CHI '08: Proceeding of the-Twenty-Sixth Annual SIGCHI Conference on Human Factors in Computing Systems, pp. 1285-1294, New York, NY, USA, 2008.

J. Rekimoto, "Pick-and-drop: A direct manipulation technique for multiple computer environments", UIST '97: Proceedings of the 10th Annual ACM Symposium on User Interface Software and Technology, pp. 31-39, New York, NY, USA, 1997.

P. Vartiainen, et al., "Mobile visual interaction: Enhancing local communication and collaboration with visual interactions", MUM '06: Proceedings of the 5th International Conference on Mobile and Ubiquitous Multimedia, p. 4, New York, NY, USA, 2006.

K-P Yee, "Peephole displays: Pen interaction on spatially aware handheld computers", CHI '03: Proceedings of the SIGCHI Conference on Human Factors in Computing Systems, pp. 1-8, New York, NY, USA, 2003.

\* cited by examiner

SYSTEMS AND METHODS FOR INTERACTING WITH MOBILE DEVICES USING EXTERNAL DISPLAYS

BACKGROUND OF THE INVENTION

1. Field of the Invention

The present invention relates to systems and methods for interacting with a mobile device using an external display, and more specifically to providing representations of objects and actions to an external, shared display for a user to select representations and input them to the mobile device.

2. Background of the Invention

Mobile devices must remain small to be portable. This requires innovative forms of interaction designed to work around the limitations of small screens and—although increasing—limited computing power and memory. One attractive way to extend our capabilities to interact with mobile devices is through external and public displays. The price per pixel is falling, and it is not unlikely that shared large displays will spread in public spaces. The human-computer interaction community is becoming increasingly interested in settings where people interact through public displays driven by multi-touch technology. For example, Peltonen et al. studied how crowds of people interacted with a large multi-touch display installed in a central location in Helsinki, Finland, over the course of 8 days. Peter Peltonen, Esko Kurvinen, Antti Salovaara, Giulio Jacucci, Tommi Ilmonen, John Evans, Antti Oulasvirta, and Petri Saarikko. *It's mine, don't touch!: interactions at a large multi-touch display in a city centre*. CHI 2008: Proceeding of the twenty-sixth annual SIGCHI conference on Human factors in computing systems, pages 1285-1294, New York, N.Y., USA, 2008. ACM.

The contemporary use of such displays is usually characterized as follows: 1) interaction follows the direct manipulation paradigm, i.e., objects on the display resemble objects that are manipulated by interacting with the display through suitable input modalities such as touch; 2) visual feedback is immediate and occurs on the display, which is the primary graphical output medium; 3) the display is driven, and objects are manipulated, by a host computer based on the received input gestures.

This means in particular that all objects manipulated through such a system are shared. Otherwise, the system must have a concept of object ownership, which requires a security policy, authentication, authorization and the delegation of access rights. Anonymous use of such a system for objects that are restricted or for which integrity and authenticity properties must be ensured is difficult. At the very least, all users must trust the display system and its host computer to enforce the security goals of individual users. For a public system under unknown authority, this is unlikely to be achieved.

Figure 1:
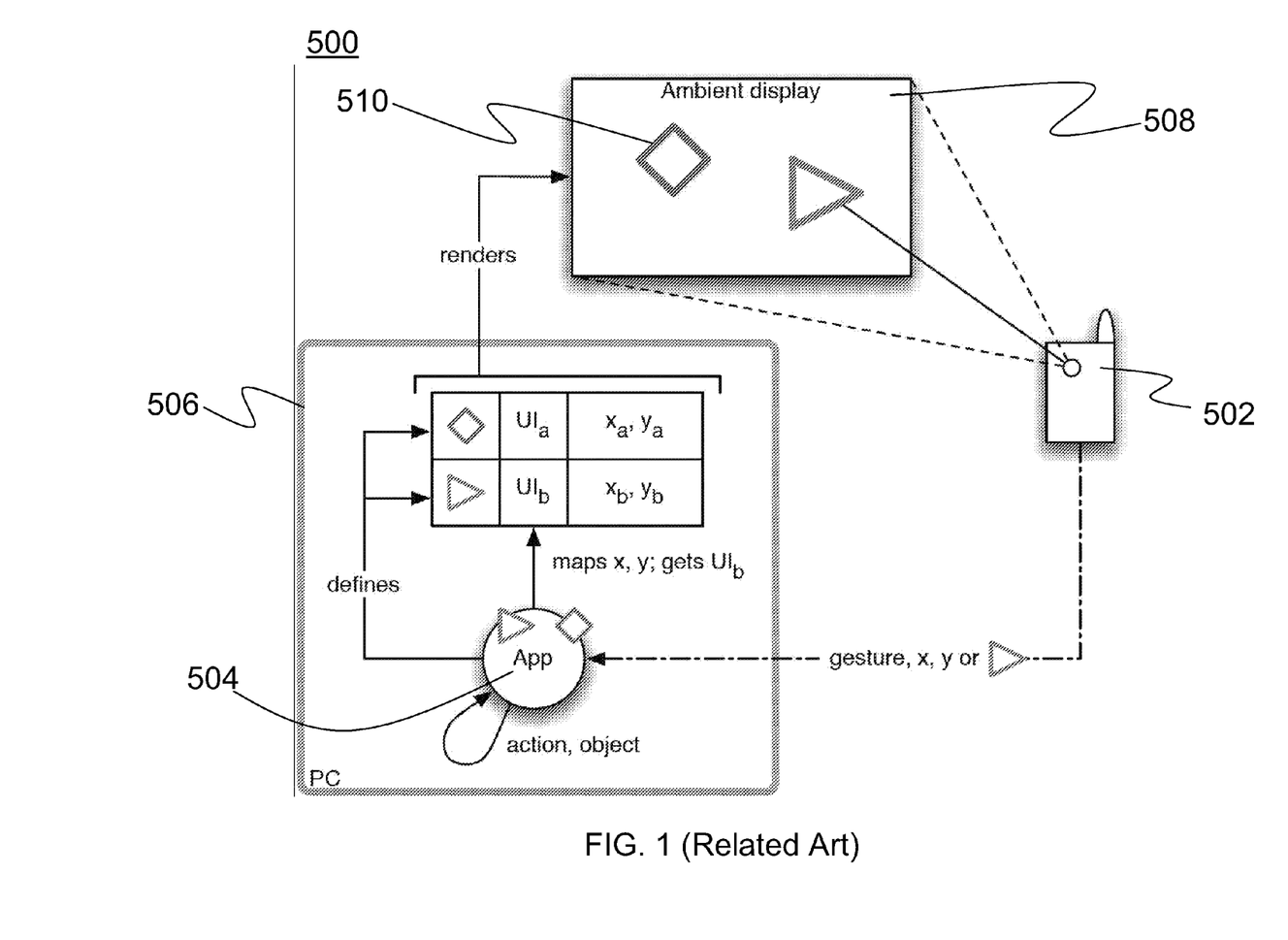
FIG. 1 depicts a representative overview of a system known in the art that enables users to interact with applications on a host system by using a mobile device, such as a camera-equipped cellular phone.

Multi-touch input gains significant traction and is the technology of choice for multi-user interaction with public displays. In the past, researchers have suggested ways to leverage camera-equipped mobile devices as input modalities for these systems. See Rafael Ballagas, Michael Rohs and Jennifer G. Sheridan; *Sweep and Point & Shoot: Phonecam-Based Interactions for Large Public Displays*; CHI 2005: Proceeding of the twenty-third annual SIGCHI conference on Human factors in computing systems, pages 1200-1203, Portland, Oreg., USA, 2005; ACM; and Hao Jiang, Eyal Ofek, Neema Moraveji, Yuanchun Shi; *Direct Pointer: Direct Manipulation for Large-Display Interaction using Handheld Cameras*; CHI 2006: Proceeding of the twenty-fourth annual SIGCHI conference on Human factors in computing systems, pages 1107-1110, Montreal, Quebec, Canada, 2005; ACM. A prototypical architecture of such a system is shown in FIG. 1, showing a system 500 that enables users with a mobile device 502 to interact with applications 504 on a host system 506 using an external display 508. The mobile device 502 recognizes displayed objects 510 and instructs the host computer 506 how to manipulate the objects 510 through simulated dragging and clicking. Alternatively, the device 502 recognizes its own position relative to the display 508 and transmits this position information to the host computer 506, similar to what a mouse would do. This information is then again used by the host computer 506 to perform manipulation tasks. Occasionally, the system allows users to annotate the manipulated object using the mobile device, e.g., by writing a note, as described in S. Greenberg, M. Boyle, and J. Laberge. PDAs and shared public displays: *Making personal information public, and public information personal*. Personal Technologies, 3(1):53-64, 1999.

Thus, it is desired to develop systems and methods that combine the benefits of using external displays for mobile devices with a secure interaction that minimizes conflicts in a public setting.

SUMMARY OF THE INVENTION

Various aspects of the present invention relates to systems and methods for interacting with a mobile device using an external display, and more specifically to systems and methods for a mobile device to provide representations of an object and action to an external display for a user to select and then input to the mobile device. In one embodiment, an application on a mobile device provides representations of an object and an action to a host system driving an external display. The host system arranges the representations on the external display and allows the user to manipulate and interact with the representations. The user then may select one or more representations and input the selected representations into the mobile device, where the application on the mobile device processes the representations to carry out the appropriate actions on the appropriate objects. The representations may be inputted to the mobile device using a photo of the representation taken by a mobile device camera, or by inputting a code provided with each representation on the external display.

The present invention also relates to a method for interacting with a mobile device using an external display, the method comprising: sending at least one representation from a mobile device to a host system; arranging the at least one representation at the host system; rendering the arranged at least one representation on an external display; selecting at least one representation; and inputting the selected at least one representation to the mobile device.

In another aspect, the method further comprises selecting the at least one representation from a combination of an object and an action to be performed on the object on the mobile device.

In still another aspect, the method further comprises mapping the inputted at least one representation to the appropriate object and action.

In a further aspect, the method further comprises performing the action upon the object.

In a yet further aspect, the method further comprises selecting a mobile device from a group consisting of a mobile phone, personal digital assistant ("PDA"), or laptop.

In another aspect, the method further comprises selecting a touch-screen external display that is larger than a display on the mobile device.

In a further aspect, the method further comprises selecting a shared, public display as the external display.

In still another aspect, the method further comprises permitting the user to re-arrange the at least one representation on the external display.

In a yet further aspect, the method further comprises inputting a picture of the selected at least one representation to the mobile device.

In another aspect, the method further comprises sending a code corresponding to each at least one representation to the host system, wherein the code is then displayed with the at least one representation on the external display.

In a further aspect, the method further comprises inputting the code to the mobile device.

In still another aspect, the method further comprises inputting a picture of the code of the selected at least one representation to the mobile device.

The present invention also relates to a system for interacting with a mobile device using an external display, comprising: a mobile device for creating at least one representation for displaying on an external display; a host system for receiving the at least one representation from the mobile device and arranging the at least one representation for rendering on the external display; and an input module for inputting at least one representation to the mobile device as selected by a user.

In another aspect, the system further comprises an application on the mobile device for creating the at least one representation from a combination of an object and an action to be performed on the object on the mobile device.

In yet another aspect, the at least one inputted representation is mapped to the appropriate object and action.

In a further aspect, the application on the mobile device performs the action upon the object.

In still another aspect, the mobile device is selected from a group consisting of a mobile phone, personal digital assistant ("PDA"), or laptop.

In a yet further aspect, the external display is a touch-screen display that is larger than a display on the mobile device.

In another aspect, the external display is a public, shared display.

In a further aspect, the user can re-arrange the at least one representation on the external display.

In still another aspect, the at least one representation being inputted to the mobile device is a picture of the selected at least one representation.

In a yet further aspect, the mobile device further creates a code corresponding to each at least one representation, wherein the code is then displayed with the at least one representation on the external display.

In yet another aspect, the code of the at least one representation selected by the user is inputted to the mobile device.

In another aspect, a picture of the code is inputted to the mobile device.

The present invention also relates to a computer-readable medium embodying a set of instructions, the set of instructions, when executed by one or more processors, causing the one or more processors to perform a method for interacting with a mobile device using an external display, the method comprising: sending at least one representation from a mobile device to a host system; arranging the at least one representation at the host system; rendering the arranged at least one representation on an external display; selecting at least one representation; and inputting the selected at least one representation to the mobile device.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION OF THE INVENTION

In the following detailed description, reference will be made to the accompanying drawing(s), in which identical functional elements are designated with like numerals. The aforementioned accompanying drawings show by way of illustration and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

An aspect of the present invention relates to systems and methods for interacting with a mobile device using an external display, and more specifically to systems and methods for a mobile device to provide representations of an object and action to an external display for a user to select and then input to the mobile device. In one embodiment, an application on a mobile device provides representations of an object and an action to a host system driving an external display. The host system arranges the representations on the external display and allows the user to manipulate and interact with the representations. The user then may select one or more representations and input the selected representations into the mobile device, where the application on the mobile device processes the representations to carry out the appropriate actions on the appropriate objects. The representations may be inputted to the mobile device using a photo of the representation taken by a mobile device camera, or by inputting a code provided with each representation on the external display.

The embodiments of the systems and methods described herein use external or public displays to manipulate representations of objects managed on and by the mobile device. The system and method proposes to leverage ambient large displays as a means to extend and ease the ways in which users can interact with their mobile devices. Counter-intuitively, the system and method proposes to use a display, typically an output device, primarily as an input device that is additionally sharable between multiple users (i.e., mobile devices).

In one embodiment, based on its internal state, an application running on a mobile device provides a set of actions that can be executed on objects. For instance, choosing a song from a list of available songs and playing it would be a provided action (select and play) on an object (the selected song). Mobile devices, such as cellular phones, smart phones, personal digital assistants ("PDAs"), and laptops are increasingly powerful and resourceful, and therefore the set of possible (object, action) combinations in a variety of applications can be quite large. The small displays of mobile devices are unsuitable for the simultaneous presentation of many objects and choices or the navigation through them. However, in the systems and methods described herein, large external displays can augment mobile devices in this task.

Figure 2:
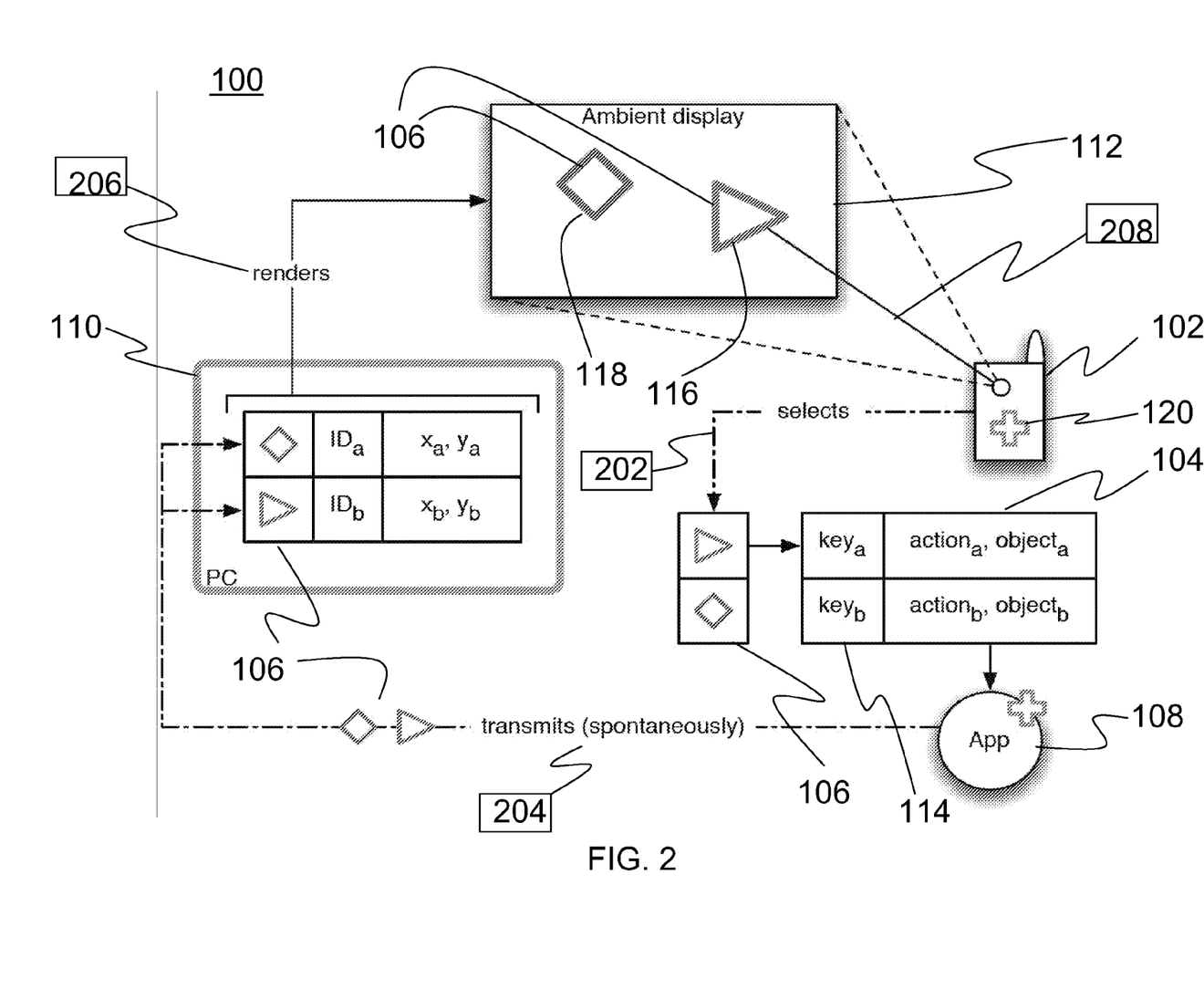
FIG. 2 depicts the architecture of a system and method for interacting with a mobile device using an external display driven by a host, according to one embodiment of the invention.

An overview of the architecture of one system 100 for interacting with a mobile device using an external display is illustrated in FIG. 2. FIG. 2 also illustrates the steps for practicing the method for interacting with a mobile device using an external display. A mobile device 102 prepares a list 104 of available (object, action) representations 106 for a specific application 108 running on the mobile device 102 (step 202). The representations are designed to summarize, resemble, and symbolize the represented objects and actions. In one embodiment, the representations may also include a set of hints on how the representations should be grouped spatially (not shown). The data of the representations 106 and any other information are then transmitted to a host system 110 (step 204) driving a large public or external display 112. The host system 110 lays the representations 106 out and renders them on an external, or ambient, display 112 in a suitable manner that minimizes conflicts with concurrent or collaborative use by other users (step 206). Conflicts can be minimized in a variety of ways, including but not limited to: force-directed layout of layout groups; combinatorial determination of suitable placements; assignment to regular non-overlapping regions or tiles on the display; scaling before placement; manual placement through direct interaction with the ambient display by denoting the region of placement by shooting a photo of the desired region (similar to Ballagas et al., 2005); or by stacking groups in layers or tabs that can be leafed through. Placements can be strictly separated or allow for a small degree of overlap. Techniques for accomplishing these goals are widely known. One approach is to perform a force-directed layout using, e.g., spring models or models based on simulated magnetic, electrical or gravitational fields. In such an approach, groups of elements belonging to different devices would be subjected to a simulated gravitational force that lets the groups sink to the bottom of the display. Overlapping groups would receive a mutually repelling force that pushes them apart. The effect of forces on the movements of groups is simulated, and results in a compact layout that stabilizes as the equilibrium is reached for the applied forces. Similar to a cup with water, the display would be filled with groups from the bottom up.

Once the representations 106 are visualized on the external display 112, a user may interact with the representations in a more useful and visually appealing interface. In particular, when the external display 112 is larger than the display on the mobile device 102, the user is able to view a significantly greater amount of information that would not otherwise be available on the display of the mobile device 102. Since each representation 106 is representative of an object and action that can be carried out on the mobile device 102, the user can select one or more representations 106 from the external display 112 and input the selected representations 106 into the mobile device 102 (step 208). Once the mobile device 102 receives the inputted representations 106, the application 108 maps the representations 106 to the predetermined object and action and performs the action on the object. Since the object does not leave the phone, this system offers a high degree of privacy and, most of all, integrity of the manipulated objects. Furthermore, inadvertent sharing is minimized. For instance, when manipulating music collections, only a representation, in the form of a graphical depiction of the music files, are transmitted to the external display. The use of representations is significant when compared to known windows and icon-based graphical user interfaces. For example, X windows can run remotely and display and handle only graphical representations of files, but not the files themselves. It is not essential that the files themselves are not acted upon by the display, but it is a distinguishing characteristic of one embodiment of the invention that a mobile device need not manage the layout and coordinates of the representations. The mobile device is largely ignorant of the details of how the display of the representations is managed and how the graphical representations may or may not change on the display. The only requirement is that the representations be identified in some suitable way to the device, so that the device can activate the appropriate action on the appropriate object.

In an additional embodiment, a code or key 114 is used to more easily identify each representation 106. The code is generated by the application 108 on the mobile device 102, and serves to encode an (object, action) pair. The code is then transmitted along with the data of the representations 106 to the host system 110. The codes can be kept in a table where the code is the key to interpreting the table and selecting the appropriate (object, action) pair. Codes may be unnecessary if the object and action can be decoded directly from the visible shape (e.g., the triangle 116 as opposed to the diamond 118).

The representations are designed such that they are (a) visually meaningful for users and (b) can be easily decoded by the device or entered into the device by the user. In one embodiment, the combination (Mysterons, play) could be represented by the cover art of Portishead's Dummy album and the song title "Mysterons", accompanied with a bar code and numeric code. In order to trigger the action, the user may enter the numeric code into his or her phone, or use a built-in camera to automatically scan the bar code. The phone maps the code into the proper (object, action) pair and executes it, perhaps after asking for additional confirmation by the user on the device itself.

It should be noted that the scope and validity of the identifying code is internal to the phone, and the phone may assign codes to (object, action) pairs randomly. In an alternative embodiment, the code does not necessarily identify the object uniquely because the action on the object is identified along with the object and multiple (object, action) combinations; for the same object can be displayed simultaneously. This differs from contemporary applications of barcodes to information retrieval on cell phones. In a further embodiment, the code encodes an (objection, action) pair and a message authentication code, which supports stateless operation where the phone can leave a persistent objection/action pair that cannot be forged by a malicious display or other devices.

One embodiment of the system and method is similarly illustrated with the reference architecture given in FIG. 2. The mobile device 102, depicted as a cell phone, has an internal state and a set of objects 120 on which it supports a number of operations. The application 108 chooses appropriate representations 106 for combinations of objects 120 and actions on them, then transmits data of the representations to the host system 110 for rendering on the external display 112. The data transmission may contain hints for how to arrange or layout the representations 106. In one embodiment, the transmission may include this information in the form of a XML file. In doing so, the system 110 that drives the external display 112 may keep a record of where which representation 106 appears on the display screen 112 for internal management purposes. Once the representations 106 are displayed, at a suitable time the user chooses one or multiple representations 106 to input into the application 108 running on the phone 102. The code portion 114 of the representation 106 is entered into the phone 102 for example by keying in the code 114 displayed as part of the representation 106, or by taking a photo of a machine decodable part of the representation 106, such as a barcode. The phone 102 then maps the code 114 to the predetermined object and action and performs the action on the object.

The following examples are only a few possible uses of this architecture by applications on a mobile device such as a smart phone.

In one embodiment, when composing an electronic mail for a recipient on a mobile device such as a cell phone, a user may attach a number of files chosen from a large collection of files on the cell phone to the composed mail. The user may preselect file categories such as image files, and the host system then arranges for their presentation on the external display. The images can be represented on the display by, for example, a thumbnail, barcode or numeric code. The user then has multiple options for inputting their selected images to the phone. A first option is to select files by photographing the barcode, which is then automatically decoded by the phone using, for example, optical recognition software. A second option is to enter the numeric code into the phone if, for example, the phone does not support barcode scanning. In one embodiment, the phone can auto-complete codes that are entered based on the uniqueness of the entered prefix. The phone may also show thumbnails of all possible completions on its own display so that the user can finish the selection by tapping on the thumbnail of the desired file. Additionally, the device can perform a closest-match search on the thumbnails from the display using any number of content-based image retrieval methods, such as the use of Scale Invariant Feature Transform (SIFT), discussed in David G. Lowe; *Distinctive Image Features from Scale-Invariant Keypoints*; International Journal of Computer Vision; Vol. 60, n. 2, pp. 91-110; November 2004. Another recent example of near-duplicate image retrieval techniques using SIFT features is discussed in Foo & Sinha; *Pruning SIFT for Scalable Near-Duplicate Image Matching*; ADC 2007: Proceedings of the Eighteenth Conference on Australiasian Database; Ballarat, Victoria, Australia; pp. 63-71; Australian Computer Society, 2007. In this example, a photographed album cover would be matched against the images of all the candidate cover albums, and the closest match would be the candidate for activation, typically after confirmation by the user through re-display of the album cover that is about to be selected as an (action, object) pair on the mobile device.

In an alternate embodiment, the system is useful for selecting from a number of documents from the external display for printing at a remote location. In a fashion similar to the scenario described above, the user may choose one or multiple documents from a large collection of documents arranged on the external display for printing on a nearby printer.

In an additional embodiment, the system can be designed for creating music playlists from a large database of songs. In a fashion similar to the scenario described above, the user can view a large list of songs on the external display and even manipulate their arrangement on the display in order to determine the songs to be selected for the playlist. Once the user has determined what songs to include in the playlist, the user can input the image coded for the song, or the code representative of the song into the phone, after which the application on the phone will create the desired playlist on the phone.

In another embodiment, in a fashion similar to the scenario described above, the user can have the slides of one or many presentations on his mobile phone displayed on the external display. The user can then more easily review all of the presentations and decide which presentations to synthesize or which slides from which presentations to combine into a new presentation.

In an additional embodiment, a user can organize address books and groups by viewing a large number of contacts on the external display. In a fashion similar to the scenario described above, the user can add people from his address book to particular groups in a social network or e-mail contacts list, or even remove people from groups.

One skilled in the art will appreciate that the list of potential uses can be extended in arbitrary ways for different applications. Note that users may still interact with representations on the external display e.g., by rearranging them using multi-touch interaction with the external display itself. However, this does not affect the state of the mobile device in any way until the inputting process described above occurs. Still, there may be a benefit in first rearranging representations followed by selection by the means provided by our system and method.

In another embodiment, the representations may be updated on the external display to provide the user with constantly changing information.

In one embodiment, the codes of representations are valid only locally on the phone that created them. However, in an alternate embodiment, users may enter them into other phones. The other phone would then know that the code is not valid, and it could query the host system of the external display to obtain the identifier of the phone that created that code. If the original phone elected to be identifiable, then the external display system may respond with the phone identifier of the original phone. That identifier would then enable the other phone to query the first phone for the object associated with the representation code. In this fashion, the system can be extended to support controlled sharing between collaborating users of the same external display system.

Figure 3:
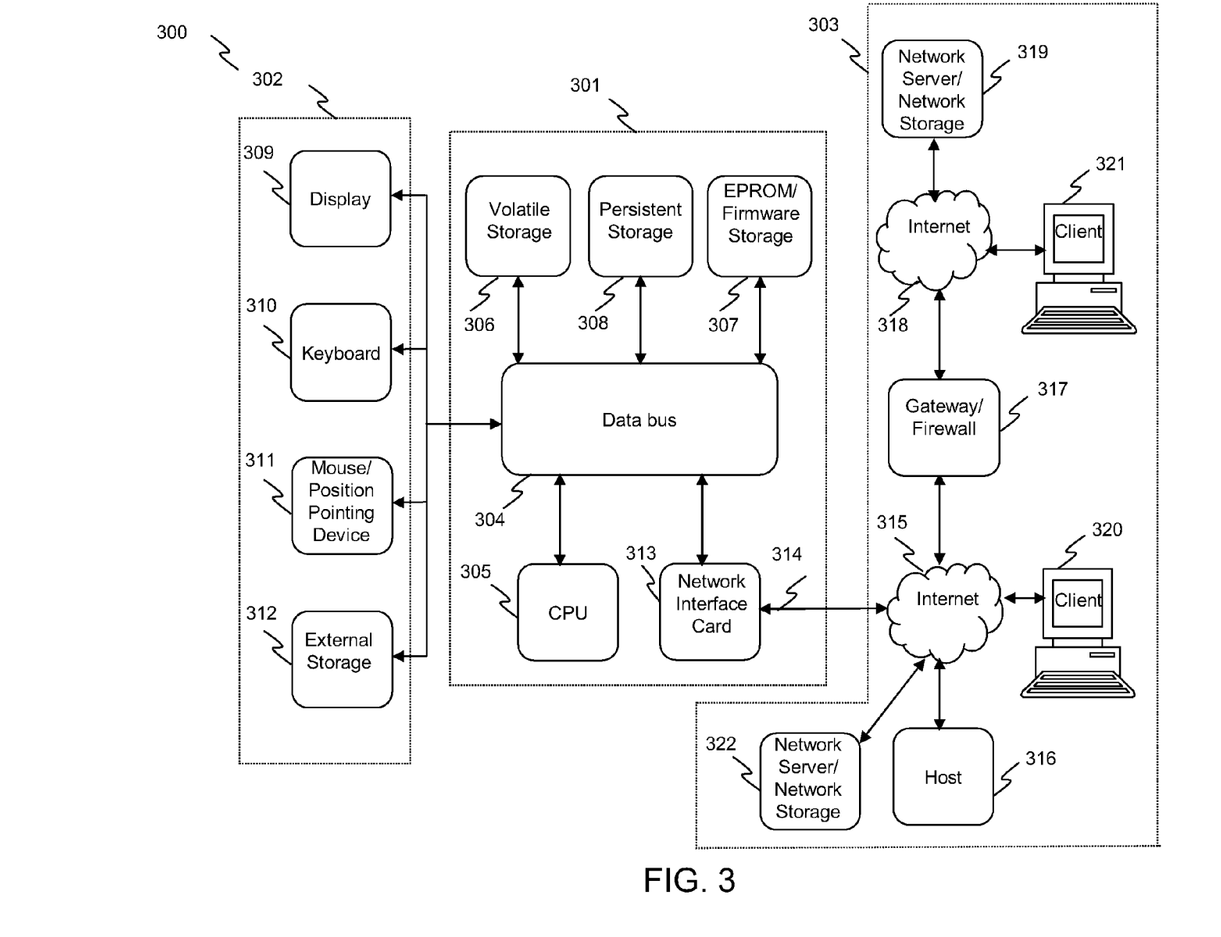
FIG. 3 illustrates an exemplary embodiment of a computer platform upon which the inventive system may be implemented.

FIG. 3 is a block diagram that illustrates an embodiment of a computer/server system 300 upon which an embodiment of the inventive methodology may be implemented. The system 300 includes a computer/server platform 301, peripheral devices 302 and network resources 303.

The computer platform 301 may include a data bus 304 or other communication mechanism for communicating information across and among various parts of the computer platform 301, and a processor 305 coupled with bus 301 for processing information and performing other computational and control tasks. Computer platform 301 also includes a volatile storage 306, such as a random access memory (RAM) or other dynamic storage device, coupled to bus 304 for storing various information as well as instructions to be executed by processor 305. The volatile storage 306 also may be used for storing temporary variables or other intermediate information during execution of instructions by processor 305. Computer platform 301 may further include a read only memory (ROM or EPROM) 307 or other static storage device coupled to bus 304 for storing static information and instructions for processor 305, such as basic input-output system (BIOS), as well as various system configuration parameters. A persistent storage device 308, such as a magnetic disk, optical disk, or solid-state flash memory device is provided and coupled to bus 301 for storing information and instructions.

Computer platform 301 may be coupled via bus 304 to a display 309, such as a cathode ray tube (CRT), plasma display, or a liquid crystal display (LCD), for displaying information to a system administrator or user of the computer platform 301. An input device 320, including alphanumeric and other keys, is coupled to bus 301 for communicating information and command selections to processor 305. Another type of user input device is cursor control device 311, such as a mouse, a trackball, or cursor direction keys for communicating direction information and command selections to processor 304 and for controlling cursor movement on display 309. This input device typically has two degrees of freedom in two axes, a first axis (e.g., x) and a second axis (e.g., y), that allows the device to specify positions in a plane.

An external storage device 312 may be connected to the computer platform 301 via bus 304 to provide an extra or removable storage capacity for the computer platform 301. In an embodiment of the computer system 300, the external removable storage device 312 may be used to facilitate exchange of data with other computer systems.

The invention is related to the use of computer system 300 for implementing the techniques described herein. In an embodiment, the inventive system may reside on a machine such as computer platform 301. According to one embodiment of the invention, the techniques described herein are performed by computer system 300 in response to processor 305 executing one or more sequences of one or more instructions contained in the volatile memory 306. Such instructions may be read into volatile memory 306 from another computer-readable medium, such as persistent storage device 308. Execution of the sequences of instructions contained in the volatile memory 306 causes processor 305 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 305 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 308. Volatile media includes dynamic memory, such as volatile storage 306. Transmission media includes coaxial cables, copper wire and fiber optics, including the wires that comprise data bus 304.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 305 for execution. For example, the instructions may initially be carried on a magnetic disk from a remote computer. Alternatively, a remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on the data bus 304. The bus 304 carries the data to the volatile storage 306, from which processor 305 retrieves and executes the instructions. The instructions received by the volatile memory 306 may optionally be stored on persistent storage device 308 either before or after execution by processor 305. The instructions may also be downloaded into the computer platform 301 via Internet using a variety of network data communication protocols well known in the art.

The computer platform 301 also includes a communication interface, such as network interface card 313 coupled to the data bus 304. Communication interface 313 provides a two-way data communication coupling to a network link 314 that is connected to a local network 315. For example, communication interface 313 may be an integrated services digital network (ISDN) card or a modem to provide a data communication connection to a corresponding type of telephone line. As another example, communication interface 313 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 313 sends and receives electrical, electromagnetic or optical signals that carry digital data streams representing various types of information.

Network link 313 typically provides data communication through one or more networks to other network resources. For example, network link 314 may provide a connection through local network 315 to a host computer 316, or a network storage/server 317. Additionally or alternatively, the network link 313 may connect through gateway/firewall 317 to the wide-area or global network 318, such as an Internet. Thus, the computer platform 301 can access network resources located anywhere on the Internet 318, such as a remote network storage/server 319. On the other hand, the computer platform 301 may also be accessed by clients located anywhere on the local area network 315 and/or the Internet 318. The network clients 320 and 321 may themselves be implemented based on the computer platform similar to the platform 301.

Local network 315 and the Internet 318 both use electrical, electromagnetic or optical signals that carry digital data streams. The signals through the various networks and the signals on network link 314 and through communication interface 313, which carry the digital data to and from computer platform 301, are exemplary forms of carrier waves transporting the information.

Computer platform 301 can send messages and receive data, including program code, through the variety of network(s) including Internet 318 and LAN 315, network link 314 and communication interface 313. In the Internet example, when the system 301 acts as a network server, it might transmit a requested code or data for an application program running on client(s) 320 and/or 321 through Internet 318, gateway/firewall 317, local area network 315 and communication interface 313. Similarly, it may receive code from other network resources.

The received code may be executed by processor 305 as it is received, and/or stored in persistent or volatile storage devices 308 and 306, respectively, or other non-volatile storage for later execution. In this manner, computer system 301 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the system and method for interacting with a mobile device using a large display. For example, the described software may be implemented in a wide variety of programming or scripting languages, such as Assembler, C/C++, perl, shell, PHP, Java, etc.

Although various representative embodiments of this invention have been described above with a certain degree of particularity, those skilled in the art could make numerous alterations to the disclosed embodiments without departing from the spirit or scope of the inventive subject matter set forth in the specification and claims. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. Also, various aspects and/or components of the described embodiments may be used singly or in any combination in the system and method for interacting with mobile devices using external displays. It is intended that all matter contained in the above description or shown in the accompanying drawings shall be interpreted as illustrative only and not limiting.

What is claimed is:

1. A method for interacting with a mobile device using an external display, the method comprising:
   sending representation data from a mobile device to a host system;
   sending a code corresponding to each representation of the representation data to the host system;
   arranging a plurality of representations from the representation data at the host system;
   rendering the plurality of representations of the arranged representation data on an external display;
   selecting at least one representation of the plurality of representations from a combination of an object and an action from a set of actions to be performed on the object on the mobile device;
   inputting the selected at least one representation and the code to the mobile device;
   mapping the inputted at least one representation to the combination of the object and the action; and
   performing the action upon the object at the mobile device in response to the inputting,
   wherein the code is displayed with each of the plurality of representations on the external display, and
   wherein the code corresponding to each of the plurality of representations encodes a respective object and a respective action to be performed on the respective object on the mobile device.

2. The method of claim 1, further comprising selecting a mobile device from a group consisting of a mobile phone, personal digital assistant ("PDA"), or laptop.

3. The method of claim 2, further comprising selecting a touch-screen external display that is larger than a display on the mobile device.

4. The method of claim 3, further comprising selecting a shared, public display as the external display.

5. The method of claim 1, further comprising permitting the user to re-arrange the at least one representation on the external display.

6. The method of claim 1, further comprising inputting a picture of the selected representation to the mobile device.

7. The method of claim 6, wherein inputting the picture of the selected representation to the mobile device comprises capturing the picture of the selected representation with a camera of the mobile device.

8. The method of claim 1, further comprising inputting a picture of the code of the selected representation to the mobile device.

9. A system for interacting with a mobile device using an external display, comprising:
   a mobile device for creating representation data for displaying a plurality of representations on an external display;
   a host system for receiving the representation data from the mobile device and arranging the representation data for rendering the plurality of representations on the external display;
   an input module for inputting at least one representation of the plurality of representations to the mobile device as selected by a user; and
   an application on the mobile device for creating the representation data from a combination of an object and an action from a set of actions to be performed on the object on the mobile device;
   wherein the application on the mobile device performs the action upon the object in response to the inputting,
   wherein the mobile device further creates a code corresponding to each at least one representation,
   wherein the code is displayed with each of the plurality of representations on the external display,
   wherein the code corresponding to each of the plurality of representations encodes a respective object and a respective action to be performed on the respective object on the mobile device,
   wherein the at least one representation is mapped to the combination of the object and the action, and
   wherein the code of the at least one representation selected by the user is inputted to the mobile device.

10. The system of claim 9, wherein the mobile device is selected from a group consisting of a mobile phone, personal digital assistant ("PDA"), or laptop.

11. The system of claim 10, wherein the external display is a touch-screen display that is larger than a display on the mobile device.

12. The system of claim 11, wherein the external display is a public, shared display.

13. The system of claim 9, wherein the user can re-arrange the at least one representation on the external display.

14. The system of claim 9, wherein the at least one representation being inputted to the mobile device is a picture of the selected at least one representation.

15. The method of claim 14, wherein the mobile device comprises a camera and wherein inputting the picture of the selected at least one representation is conducted by capturing a snapshot of the picture with the camera.

16. The system of claim 9, wherein a picture of the code is inputted to the mobile device.

17. A non-transitory computer-readable medium embodying a set of instructions, the set of instructions, when executed by one or more processors, causing the one or more processors to perform a method for interacting with a mobile device using an external display, the method comprising:
    sending representation data from a mobile device to a host system;
    sending a code corresponding to each representation of the representation data to the host system;
    arranging the representation data into a plurality of representations at the host system;
    rendering the arranged plurality of representations on an external display;
    selecting at least one representation of the plurality of representations from a combination of an object and an action from a set of actions to be performed on the object on the mobile device;
    inputting the selected at least one representation and the code to the mobile device;
    mapping the inputted at least one representation to the combination of the object and the action; and
    performing the action upon the object at the mobile device in response to the inputting,
    wherein the code is displayed with each of the plurality of representations on the external display, and
    wherein the code corresponding to each of the plurality of representations encodes a respective object and a respective action to be performed on the respective object on the mobile device.

\* \* \* \* \*